F. M. STOLL.
AUTOMOBILE BODY BRACE.
APPLICATION FILED AUG. 29, 1919.

1,427,763.

Patented Aug. 29, 1922.

WITNESS:
A. W. Rick
Dorothy Guenter

Frank M. Stoll.
INVENTOR.

BY Jno. G. Powell
ATTORNEY.

UNITED STATES PATENT OFFICE.

FRANK M. STOLL, OF DENVER, COLORADO.

AUTOMOBILE BODY BRACE.

1,427,763. Specification of Letters Patent. Patented Aug. 29, 1922.

Application filed August 29, 1919. Serial No. 320,698.

*To all whom it may concern:*

Be it known that I, FRANK M. STOLL, a citizen of the United States, and a resident of the city and county of Denver and State of Colorado, have invented certain new and useful Improvements in Automobile Body Braces, of which the following is a full, clear, and exact description, such as will enable others skilled in the art to which the invention appertains to make and use the same.

The invention relates to improvements in braces for re-enforcing vehicle bodies; particularly of the automobile type.

The object of the invention is to provide a transverse body brace adapted to connect the running boards of an automobile and to be supported by the longitudinal chassis frame members of the automobile, whereby the brace serves as a re-enforcing or stiffening means for the body of the automobile.

In the following description, other objects of the invention will become apparent.

Figure 1:
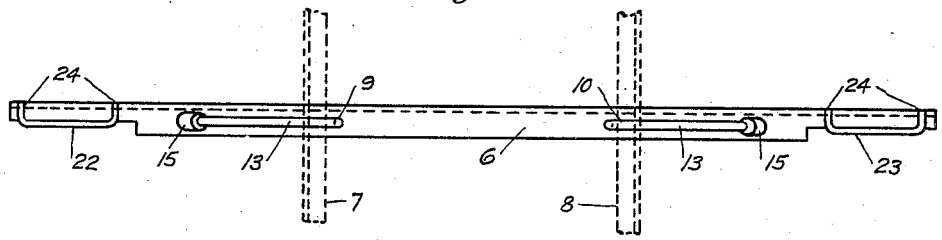
Figure 2:
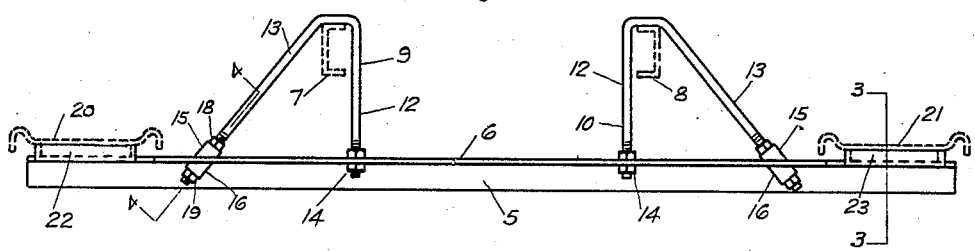
Figure 3:
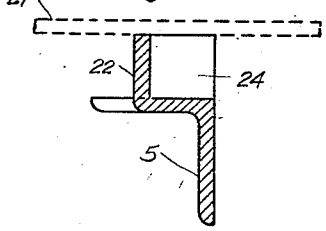
Figure 4:
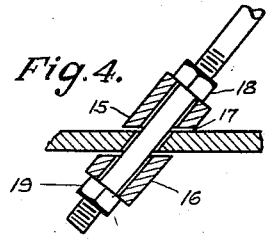

Referring to the accompanying drawing: Figure 1 is a plan view of the brace; Figure 2 is a side view of the same; Figure 3 is a cross sectional view taken on the line 3—3 of Figure 2; and Figure 4 is a detail cross sectional view, taken on the line 4—4 of Figure 2, and illustrating the manner of fastening the inclined portion of the ties to the brace.

Corresponding and like parts are referred to in the following description and indicated in all the views of the accompanying drawing by the same reference characters.

5 represents in its entirety a bar adapted to be disposed transversely underneath the automobile body. This bar is formed of angle iron, the part 6 thereof being horizontally disposed. By employing an angle iron bar 5 a relatively greater degree of strength and rigidity is provided with a minimum weight.

7 and 8 represent the longitudinal chassis frame members upon which the body of the automobile is mounted. Tie members 9 and 10, each of which is of identical construction, pass over the chassis frame members 7 and 8 and connect with the horizontal part 6 of the angle iron bar 5. These tie members 9 and 10 are composed of vertical parts 12 and inclined parts 13. The vertical parts 12 pass through the horizontal part 6 of the angle bar 5 and are secured to the latter by means of two nuts 14, between which the horizontal part 6 of the angle bar 5 is disposed. These nuts 14 are threaded upon the vertical parts 12. The inclined parts 13 of the ties 9 and 10 also pass through the horizontal part 6 of the angle bar 5, said inclined members extending outwardly from the chassis frame members 7 and 8.

In Figure 4, a detail of the means for connecting the inclined members 13 with the angle bar 5 is shown. This means consists of two washers 15 and 16 through which the inclined members 13 passes, said washers 15 and 16 being disposed on opposite sides of the horizontal part 6 of the angle bar 5 and engage with said horizontal part 6. The inner extremities, or the extremities adjacent the horizontal part 6 of the angle bar 5 are beveled as shown at 17, whereby said washers 15 and 16 closely engage with said horizontal part 6 and clasp the latter therebetween. A lock nut 18 is threaded upon each of the ties 9 and 10 and engages with the washer 15, and a similar nut 19 is threaded on each of said inclined parts 13 and engages with the washer 16. By threading these two nuts 18 and 19 towards the washers 15 and 16, the latter are caused to engage the horizontal part 6 of the angle bar 5 tightly therebetween.

From the foregoing description, it will be seen that the angle bar 5 may be drawn upwardly by means of the ties 9 and 10 until the extremities of the angle bar 5 tightly engage with the under sides of the running boards 20 and 21 of the automobile. The ordinary automobile running board is of channel shape on its lower side, and it is usually necessary to employ some sort of block, or other means upon the brace to be received in such channel. In this drawing, the usual channel shaped running boards are shown, and my invention is primarily designed and used in connection with such running boards; however, it may be used with equal advantage in connection with running boards of flat under surface.

The horizontal part 6 of the angle bar 5 is provided with cut-out portions 22 and 23 respectively at the opposite extremities of the angle bar 5. These cut-out portions are bent upwardly at right angles to the horizontal part 6 of the angle bar 5, and the extremities of the cut-out portions 22 and 23 are bent at right angles to the latter, and extend transversely of the horizontal part 6, as shown at 24, whereby these portions 22 and 23 are not only re-enforced, but present a relatively larger engaging area to rest against the under side of the running boards 20 and 21. These upwardly bent portions 22 and 23 are received in the channels of the running boards 20 and 21.

While I have described and illustrated herein a specific form of my invention, it is understood that the same may be modified and varied within certain limitations as particularly defined by the appended claims.

Having thus described my invention, what I claim and desire to secure by Letters Patent is:—

1. A brace for vehicle bodies, comprising a bar of metal adapted to extend transversely under the vehicle, means tying said bar to the chassis frame, and the opposite extremities of said bar having integral parts cut out of same and bent upwardly at right angles adapted to engage with the under side of the running boards of the vehicle.

2. A brace for automobile bodies, comprising an angle bar of metal adapted to extend transversely under the body, ties extending under the longitudinal chassis members and connected with the horizontal portion of said angle bar whereby the latter is supported, and the opposite extremities of the horizontal portion of said angle bar having integral parts cut out of same and bent upwardly at right angles, the extremities of said parts being bent transversely of the horizontal portion of the angle bar, said parts adapted to engage with the under side of the running boards of the automobile.

In testimony whereof, I affix my signature.

FRANK M. STOLL.